United States Patent
Huang et al.

(10) Patent No.: US 10,869,012 B2
(45) Date of Patent: Dec. 15, 2020

(54) APPARATUS AND METHOD FOR RECORDING AND STORING VIDEO

(71) Applicants: Mindtronic AI Co., Ltd., Grand Cayman (KY); Shanghai XPT Technology Limited, Shanghai (CN)

(72) Inventors: Mu-Jen Huang, Taipei (TW); Ya-Li Tai, Taoyuan (TW); Yu-Sian Jiang, Kaohsiung (TW)

(73) Assignees: Mindtronic AI Co., Ltd., Grand Cayman (KY); Shanghai XPT Technology Limited, Shanghai (CN)

( * ) Notice: Subject to any disclaimer, the term of this patent is extended or adjusted under 35 U.S.C. 154(b) by 0 days.

(21) Appl. No.: 16/191,457

(22) Filed: Nov. 15, 2018

(65) Prior Publication Data

US 2019/0149793 A1 May 16, 2019

(30) Foreign Application Priority Data

Nov. 16, 2017 (CN) .......................... 2017 1 1140740
Nov. 16, 2017 (CN) ...................... 2017 2 1534595 U

(51) Int. Cl.
| | |
|---|---|
| *H04N 5/77* | (2006.01) |
| *H04N 5/765* | (2006.01) |
| *H04N 9/79* | (2006.01) |
| *H04N 7/18* | (2006.01) |
| *H04N 9/797* | (2006.01) |
| *H04N 5/92* | (2006.01) |
| *H04N 5/93* | (2006.01) |

(52) U.S. Cl.
CPC ........... *H04N 9/7921* (2013.01); *H04N 5/772* (2013.01); *H04N 7/183* (2013.01); *H04N 7/188* (2013.01); *H04N 9/79* (2013.01); *H04N 9/797* (2013.01)

(58) Field of Classification Search
USPC ........ 386/232, 228, 227, 200, 326, 353, 278
See application file for complete search history.

(56) References Cited

U.S. PATENT DOCUMENTS

| | | | | |
|---|---|---|---|---|
| 10,109,319 B2* | 10/2018 | Moore | ................. | G11B 27/031 |
| 2002/0191952 A1* | 12/2002 | Fiore | ........................ | H04N 5/76 386/217 |
| 2011/0112719 A1* | 5/2011 | Marumoto | ................ | G01F 9/02 701/33.4 |

* cited by examiner

*Primary Examiner* — Daquan Zhao
(74) *Attorney, Agent, or Firm* — Winston Hsu

(57) ABSTRACT

A video recording device includes an image capturing module, a storage unit and a processing unit. The image capturing module is configured to capture a raw video in a first video format. The processing unit is configured to convert video session(s) other than the lately captured video content from the first video format into a second video format. The second video format is inferior than the first video format.

14 Claims, 5 Drawing Sheets

APPARATUS AND METHOD FOR RECORDING AND STORING VIDEO

BACKGROUND OF THE INVENTION

1. Field of the Invention

The present disclosure relates to a video recording device and a method for recording and storing a video, and more particularly, to a video recording device and a method for recording a video and storing with a variety of video format.

2. Description of the Prior Art

In general, a video recording device may capture videos with various resolutions. On the one hand, a high-quality video may remain all necessary information but will require more storage space. One the other hand, videos with a lower resolution, though data sizes could be smaller, may loss important data. The issue could be critical when it comes to vehicle recorders. For instance, information such as license plate numbers, vehicle types could be missing from captured images.

SUMMARY OF THE INVENTION

The disclosed technology provides a video recording device and traffic recording method.

In one aspect of the present disclosure, a video recording device is provided. The video recording device includes an image capturing module, a storage unit, and a processing unit. The image capturing module is configured to capture a raw video in a first video format. The raw video includes at least two video sessions. The storage unit includes multiple storage spaces and is configured to store the raw video. The processing unit is configured to convert the video session(s) other than the lately captured video session from the first video format into a second video format, while preserve the lately captured video session of the raw video in the first video format. The first video format is of a higher quality than the second video format.

In another aspect of the present disclosure, a method for recording and storing a video is provided. The method includes the following actions. A raw video is captured, by an image capturing module, in a first video format. The raw video includes at least two video sessions and is stored in the storage unit. The video session(s) other than the lately captured video session is/are converted, by a processing unit, from the first video format into a second video format, while the quality of the lately captured video session is preserved. The second video format is inferior than the first video format.

In yet another aspect of the present disclosure, a non-transitory machine-readable storage medium including instructions, which performed by one or more processors, causing the one or more processors to perform a method of recording and storing a video is provided. The medium contains instructions, when performed by processor(s) will perform the method including the following actions. Capturing a raw video in a first video format. The raw video includes at least two video sessions. Converting the video session(s) other than the lately captured video session from the first video format into a second video format, while the quality of the lately captured video session is preserved. The first video format is superior than the second video format.

In summary, the video recording device of the present disclosure may convert the raw video into a lower-quality video and then store in the storage space, so that more video contents could be stored in the limited storage space. Furthermore, when a collision occurs, a trigger signal is generated by the sensing unit to store the higher-quality video, and thus the detailed information of the video may be recognized. Moreover, when a higher-quality video is desired, the user may command through the input interface to store the higher-quality video.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
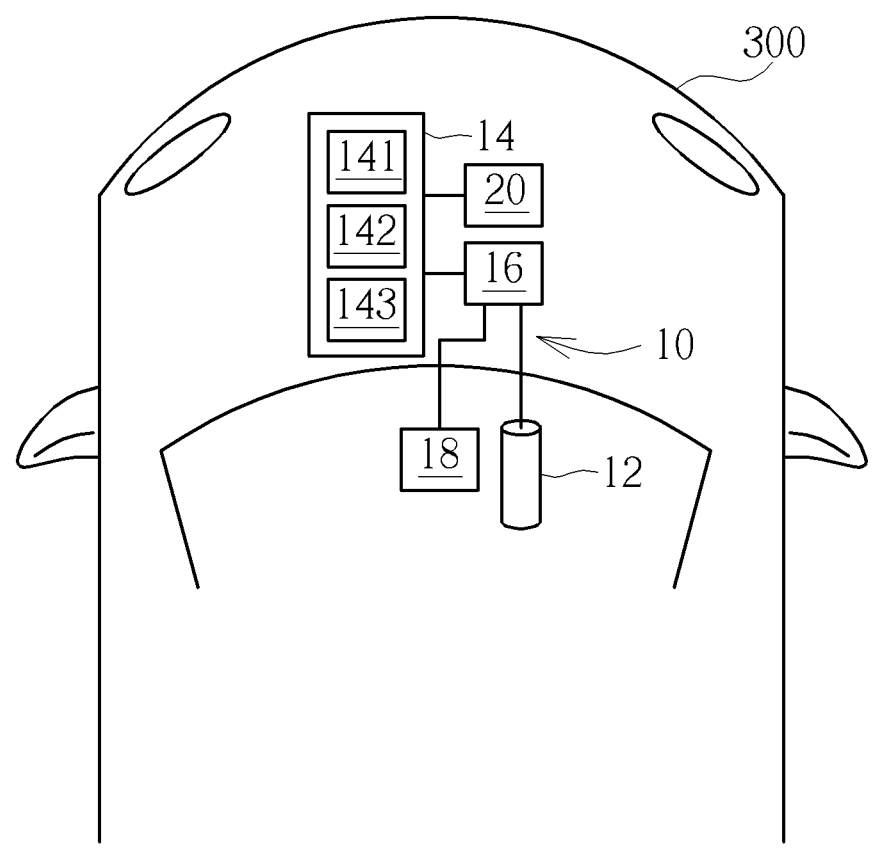
FIG. 1 is a schematic diagram of a video recording device in accordance with the disclosed technology.

FIG. 1 is a schematic diagram of a video recording device 10 according to an embodiment of the present disclosure. In one implementation, the video recording device 10 of the present disclosure may be disposed in a vehicle 300, for example, a bicycle, a scooter, a motorcycle, a car, a truck, a bus, a tram, a train, a ship, a boat, a helicopter or a plane.

The video recording device 10 includes an image capturing module 12, a storage unit 14, and a processing unit 16. The image capturing module 12 is a device, such as a camera, provided to capture videos. The image capturing module 12 may be able to capture videos from various directions, angles and areas. In one embodiment, the image capturing module 12 may capture raw videos of surrounding environment with one or more video format(s); alternatively, it may be configured to capture videos with a default format. In the present disclosure, one video session of a captured video may be of one video format differs from the rest.

A video format may be represented by, for instance, but not limited to, a resolution, a frame rate, a video bit rate, an audio bit rate or other parameters related to video qualities. A video captured in a higher quality may be because it has a higher resolution, a high-definition, a higher frame rate and/or a higher bit rate. The high-quality video can subsequently be converted into various formats which qualities are less satisfactory, for instance, one has a lower resolution, a standard-definition, a lower frame rate and/or a lower bit rate.

It is known by the skilled people that a video is time stamped and includes a plurality of video sessions divided by time. The duration of each video session could be identical or different depending on the settings or circumstances.

The video recording device 10 of the present disclosure further includes the processing unit 16 connected to the storage unit 14 and the image capturing module 12. The processing unit 16 may be an intelligent hardware device, such as a central processing unit (CPU), a microcontroller, or an ASIC. The processing unit 16 may process data and instructions. Additionally, the processing unit 16 may be configured to compress and/or convert videos into various formats.

Moreover, the video recording device 10 also includes the storage unit 14 which may be a volatile and/or non-volatile memory. The storage unit 14 may be removable, non-removable, or a combination thereof. Exemplary storage unit 14 include solid-state memory, hard drives, optical-disc drives, etc. The storage unit 14 may store computer-readable, computer-executable instructions (e.g., software codes) that are configured to cause the processing unit 16 to perform various instructions.

In one embodiment, the storage unit 14 may have three partitions, including a first storage space 141, a second storage space 142 and a third storage space 143. The sizes of the first storage space 141, the second storage space 142, and the third storage space 143 may be fixed or casually defined by users. The three partitions may be of different natures to serve different purposes. For instance, in one implementation, the first storage space 141 may be a temporary space serves to store raw videos captured by the image capturing module 12. Additionally, the second storage space 142 may be an erasable space which means deleting data from the second storage space 142 is rather easily. As for the third storage space 143, it is provided to store data which cannot not easily be wiped out without, for instance, going through some sort of complicate steps. In other words, the third storage space 143 is an inerasable space.

As discussed, a raw video captured by the image capturing module 12 with a first video format may be temporarily stored in the first storage space 141. At least a part of the raw video may then be converted or compressed into a second video format and consequently stored in the erasable second storage space 142. It should be noted that in the instant example the first video format is of a higher quality than the second video format. Thus, it can be speculated that the videos with the second video formats require less storage space than the videos with the first video format. In other words, assuming the sizes of the first storage space 141 and the second storage space 142 are identical, the second storage space 142 can tolerate more video contents. In some embodiments, at least a part of the raw video may be stored with a first video format in the inerasable third storage space 143. This will be discussed in detail in the later paragraph.

As disclosed, the processing unit 16 may be configured to compress/convert videos captured by the image capturing module 12 in a default format to another format. Precisely, it may encode and/or decode the video contents from one video format to another. As also has been mentioned, a video may be divided into numbers of sessions by reference to time windows. Assuming a raw video is cut into at least two sessions, including a first and a second video sessions. In light of the present disclosure, the processing unit 16 may convert the (early captured) first video session from the default format which is of a higher resolution into another format which resolution is less satisfactory to reduce the overall data size, while the quality of the (lately captured) second video session is preserved.

In one implementation, videos may be converted or compressed through some sort of data compression algorithms. In another implementation, the video may be converted or compressed as any video formats. In yet another embodiment, the video may be converted or compressed in compliance with either video compression standards, such as MPEG, H.264, HEVC.

In one embodiment, the video recording device 10 further includes a wireless communication module 20 electrically connected to the storage unit 14 and the processing unit 16. The wireless communication module 20 is configured to upload at least one video session stored in the storage unit 14 to a cloud server. In some embodiments, the cloud server may perform further image processing or other processing to the video sessions.

As the image capturing module 12 continuously in a higher quality format, the data size of the captured video grows. As a result, there may be insufficient space to store all the contents. In one embodiment, the video recording device 10 may only retain the last session of an instantly captured video to save space and meanwhile reduce the data size. The length of the last session is of a certain duration of time. For instance, a preservation window may be set beforehand to define the duration of the session that should be kept from the end of the captured video.

Figure 2:
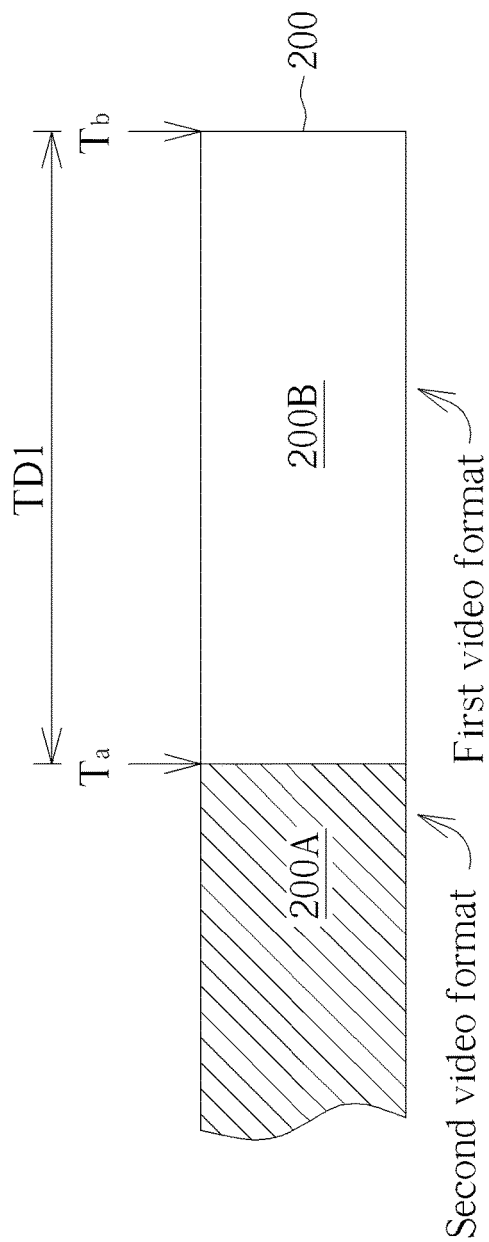
FIG. 2 is a schematic diagram demonstrating the operation of the video recording device in accordance with the disclosed technology.

FIG. 2 is a schematic diagram demonstrating the operation of the video recording device 10 in accordance with the disclosed technology. With reference to FIG. 1 as well, assuming a raw video 200 is captured by the image capturing module 12 in a higher-quality video format and temporarily stored in the first storage space 141. As mentioned, the raw video 200 is time stamped and a preservation window TD1 is pre-defined.

As exemplarily shown in FIG. 2, the raw video 200 includes at least two video sessions; one is those outside the preservation window TD1 (i.e. the first video session 200A) while the other is those within the preservation window TD1 (i.e. the second video session 200B. Assuming in the instant example the preservation window starts at the time point $T_a$ and ends at the time point $T_b$. As mentioned, the video recording device 10 retains the mere last session within the preservation window TD1. Thus, the processing unit 16 of the present disclosure is operated to convert the video session(s) outside the preservation window TD1 (i.e. here, the second session 200A) into a lower-quality video, while the video quality of the second video session 200B remains. The video session 200A which quality is lower (i.e. in the second format) now may consequently be stored into the second storage space 142. On the other hand, the video session B which quality is unchanged (i.e. in the first format) may remain in the first storage space 141 or it may be stored in another storage space, such as the third storage space 143.

As shown in FIG. 2, the length of the preservation window TD1 can either be fixed or flexibly adjusted, depending on settings. Assuming the duration is fixed to five-minute. Under the setting, the video recording device 10 will only preserve the high quality of last five-minute session of the captured video and compress the rest.

Additionally, the present disclosure may convert the video sessions into a lower quality format from the default video format while the image capturing module 12 is continuously capturing a new video session. That is, as the recording goes on, the video sessions other than the last video session (e.g. last five minutes) are continuously converted into a lower quality format to reduce the overall data size. Alternatively, the present disclosure may convert the video sessions and preserve the last one after the recording is completed.

More precisely, assuming the preservation window set for the last session is three-minute and the image capturing module 12 is continuously capturing a video in a high-quality format. In one instance, the video recording device 10 may opt to convert the session from the beginning of the video to the first minute of the video (i.e. 00:00:00 to 00:59:00) into a lower quality content when the image capturing module 12 starts to capture the fourth minute (i.e. 00:04:00) contents; meanwhile preserve the last section (i.e. 00:01:00-00:03:59) in its original high quality. As the recording keeps going, the preservation window (i.e. three-minute) moves toward the end of the video. Consequently, the video recording device 10 keep compressing those contents outside the preservation window, while maintaining the quality of the contents within the preservation window. Alternatively, the video recording device 10 may choose to store the entire video in the first storage space, and only convert the sessions other than the last three-minute when the recording is completed. It should be noted that the above are mere example to illustrate how the present disclosure works and should under no circumstance constitute any limitations.

As mentioned, one or more session(s) of the captured video outside the preservation window TD1 are converted into a lower quality video and stored in the second storage space 142, while the last session protected by the preservation window TD1 remains in the first or another storage space without being converted. In some embodiments, when the remaining space or the available space of the second storage space 142 is less than a predetermined threshold, some of the video session(s) may be removed. That is, only the latest (and converted) video sessions are preserved in the second storage space 142. Therefore, the data size of the video may be reduced, and more video contents could be stored in the storage unit 14.

A reference is made back to FIG. 1. In one implementation, the video recording device 10 may also contain a trigger device 18. The trigger device 18 is electrically connected to the processing unit 16 and configured to generate and transmit a trigger signal to the processing unit 16. The trigger signal is provided to cause the video recording device 10 to preserve the video contents with its high quality during the relevant time without conversions/compressions.

In one instance, the trigger device 18 may be a sensing unit configured to generate a trigger signal when a collision occurs. Specifically, the sensing unit may include, but not limited to, an accelerometer, a gyroscope, a pressure sensor or a device or module using a variety of sensing technologies to detect collisions or sudden changes of the surrounding environment, such as car accidents. In some implementations, the sensing unit may not be part of the video recording device 10; rather, it may be independently disposed in a vehicle and communicate with the video recording device 10 through some sort of communicating arrangements, i.e. wi-fi, Bluetooth, 4G/4G LTE telecommunication network, etc.

In another implementation, the trigger device 18 may be an input interface configured to generate a trigger signal through a manual command. The input interface may include, but not limited to, a button, a control panel, a touch screen, a switch, or a remote control. A user may discretionarily command the trigger device 18 to issue the trigger signal through the input interface when he/she determines that a higher quality video content is desired. Similarly, the video recording device 10 is operated to record and store the video contents with a higher quality in response to the trigger signal.

In one embodiment, a higher-quality video therefore obtained upon the receipt of the trigger signal may be stored in the aforementioned third storage space 143. As discussed early, data stored in the third storage space is unlikely erasable. That is, erasing data from the third storage space is not without difficulties.

Figure 3A:
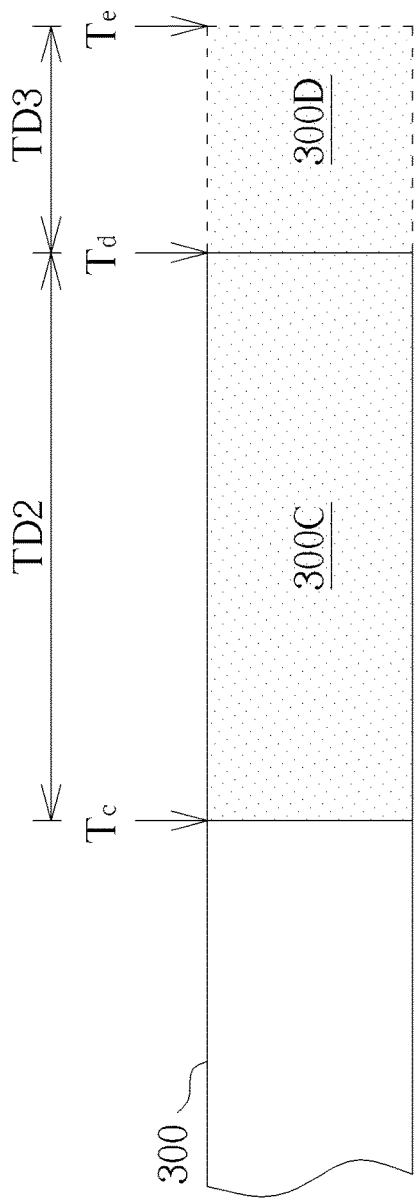
FIG. 3A is another schematic diagram demonstrating the operation of the video recording device in accordance with the disclosed technology.

FIG. 3A is another schematic diagram demonstrating the operation of the video recording device 10 in accordance with the disclosed technology. Assuming the image capturing module 12 operated to continuously capture a raw video 300 in a first (default) video format which is of high quality. The raw video 300 is also time stamped, and like the above, a critical window is defined beforehand. The critical window is provided to defined to what extent that one or more video session should be retained in response to the trigger signal. For example, as depicted in FIG. 3A, assuming a trigger signal is received at time point $T_d$ and a critical window TD2 is predefined. The video recording device 10 of the present disclosure, upon the receipt of the trigger signal at $T_d$, preserves the quality of the video content within the critical window. In one instance, the critical window covers the session ends at the time point at which the trigger signal is received. As illustrated in FIG. 3A, the critical window TD2 ends at $T_d$, so that the quality of the session within the critical window TD2 (i.e. video session 300C) remains its quality. The preserved video session 300C may be stored in the third storage space 143 without conversion. It should be noted that the length of the critical window TD2 can either be fixed or flexibly adjusted based on user settings. Additionally, since the time point, i.e. $T_d$, at which the trigger signal is received and TD2 are both known, the time point $T_c$ indicating where the video session 300C begins can therefore be obtained.

In a further embodiment, an additional critical window TD3 may also be assigned to determine to what extent a further video session after the receipt of the trigger signal should be preserved. Following the previous example, as shown in FIG. 3A, the video recording device 10 may also retain and store another video session 300D right after the receipt of the trigger signal at $T_d$, and the length of the video session 300D is TD3. Alternatively, the video recording device 10 may be also capable of capturing videos in an even higher video format than the default first video format. Thus, upon the receipt of the trigger signal at the time point $T_d$ and in addition to preserve the video session 300C in its first video format, the video recording device may cause the image capturing module 12 to record the following video contents, i.e. here, the video session 300D, in a higher video format. As discussed, the video sessions 300C and 300D may both be stored in the third storage space 143.

Although two separate critical windows TD2 and TD3 are discussed. They in fact can be considered as one critical window. Specifically, the critical window may be defined as ending at $T_d$, starting at Td, or having $T_d$ in the middle of or any place within the critical window. That is, one may decide to preserve the video content which is five-minute long immediately before the receiving of the trigger signal as well as the video content which is two-minute long immediately after the trigger signal. The above is a mere example to demonstrate how the critical window may be adjusted and should not become limitations to the embodiments.

As disclosed above, a trigger signal may occur because of a collision. Through the design of the disclosed technology, the critical video sessions before and after the collision are entirely and flawlessly preserved in an inerasable storage space. Thus, the video recording device 10 of the present disclosure can, on the one hand, retain important data and information regarding how the collision happens, while, one the other hand, increase the efficiency of the usage of the storage space.

Alternatively, a user may issue a trigger signal manually through an input interface. Similarly, upon the receipt of the trigger signal, the video recording device 10 is configured to seamlessly store the video sessions before and after the time point at which the trigger signal is received into a storage space where data is preserved and protected.

Figure 3B:
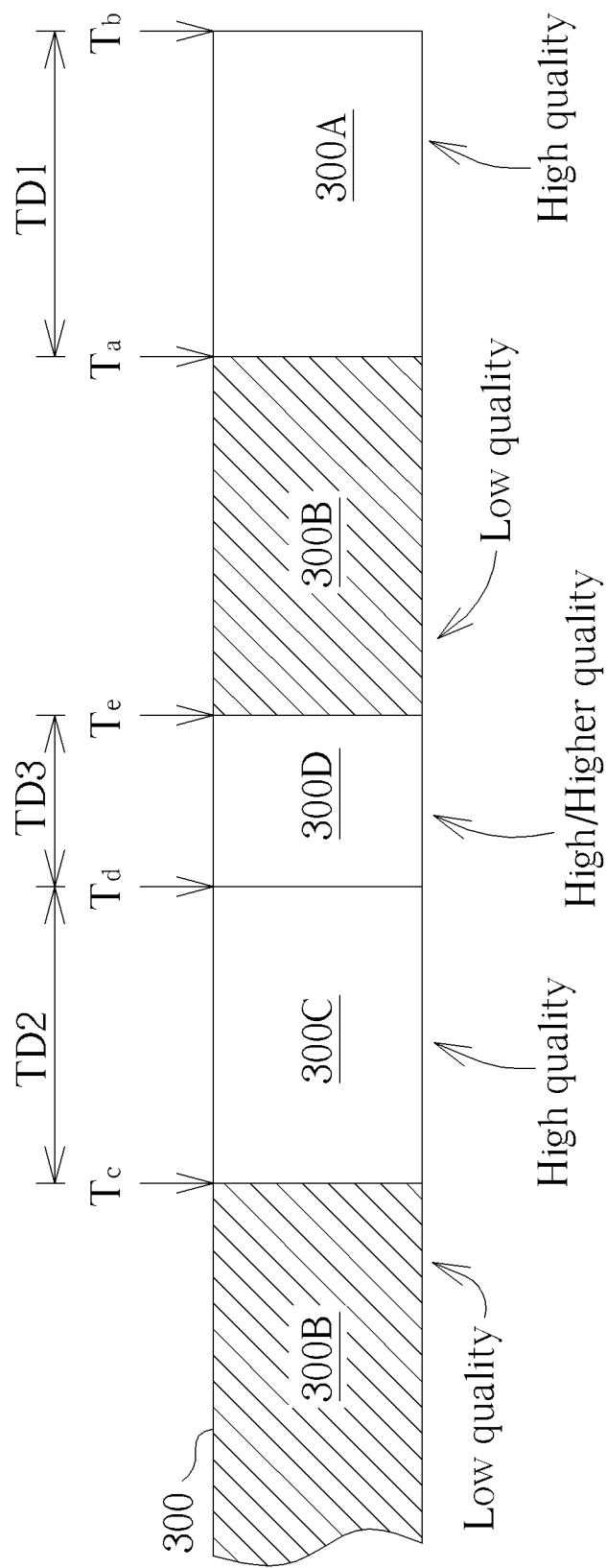
FIG. 3B is a schematic diagram demonstrating the operation of the video recording device in accordance with the disclosed technology.

FIG. 3B is a further schematic diagram demonstrating the operation of the video recording device 10 in accordance with the disclosed technology. As mentioned previously, the image capturing module 12 continuously recording a raw video 300 in a default first video format which is of high quality. If, in the absence of trigger signal to the otherwise, the video recording device 10 only preserves the last video session 300A within the preservation window TD1 to its high video quality, while converts the rest video sessions (s) 300B outside the preservation window TD1 to a second video format which quality is less satisfactory. On the other hand, if a trigger signal is received at the time point $T_d$, the video recording device 10 of the present disclosure is operated not to convert the relevant session, i.e. 300C, falling within the critical window TD2. Optionally, the video recording device 10 may further preserve the subsequent video session, i.e. 300D within another critical window TD3, following the receipt of the trigger signal; or record the video session 300D with an even higher video resolution. As also discussed, the raw video 300 and the last video session 300A may temporarily be stored in the first storage space 141; the preserved sessions 300C and 300D may be stored in the third storage space 143; and the rest session(s) 300B is/are in the second storage space 142.

It should be noted that the lengths of the preservation window and the critical window(s), TD1, TD2, and TD3 may be identical or different. Additionally, as also brought up, the video recording video 10 may convert and preserve the relevant sessions while the recording goes on. Alternatively, the conversion may be conducted while the recording is completed. In this instance, as shown in FIG. 3B, the video recording device 10 may only convert those irrelevant video session(s) 300B (i.e. those contents not covered by either the preservation window or the critical window) but preserve the relevant sessions 300A, 300C and 300D.

Figure 4:
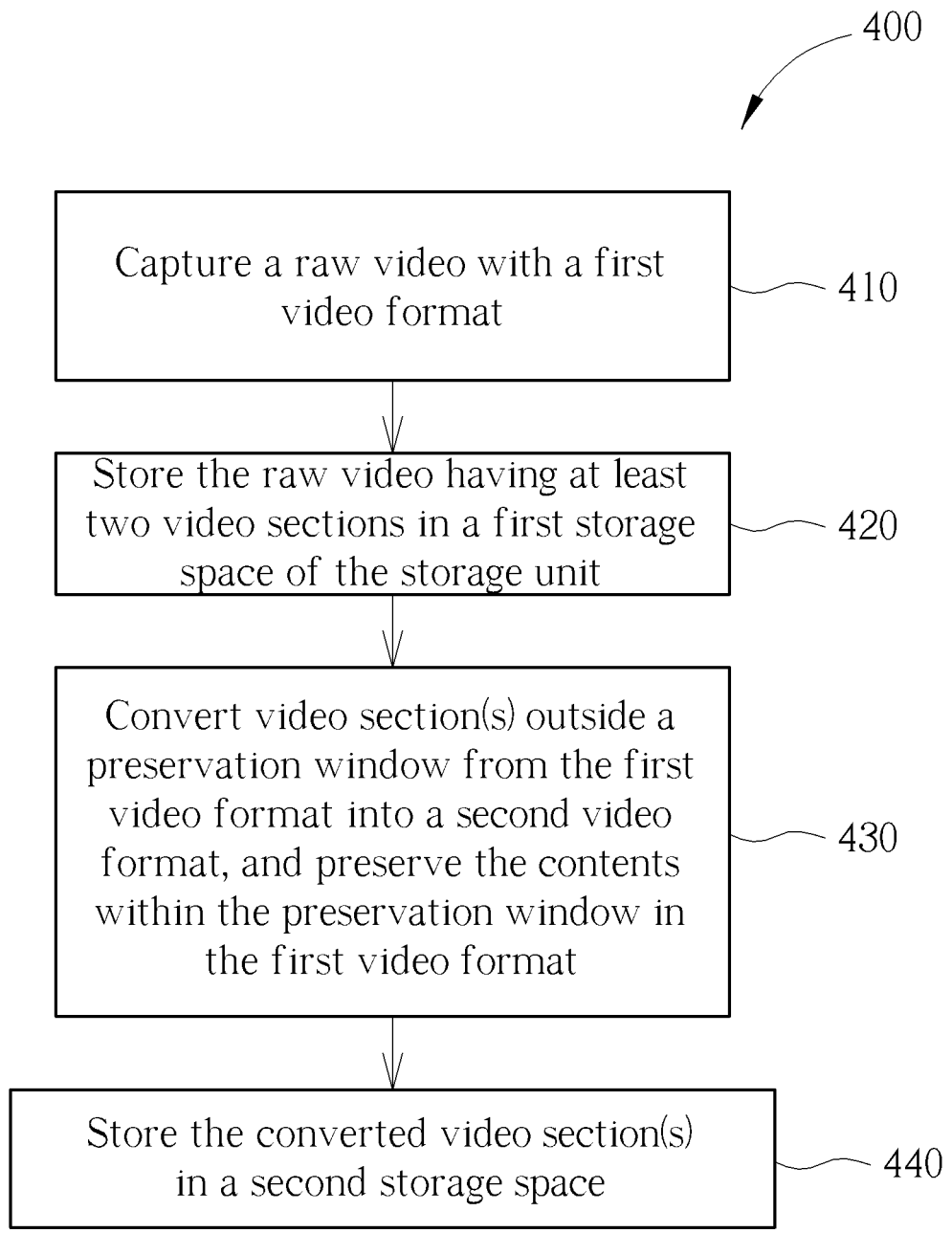
FIG. 4 is a flowchart of a method for recording and storing a video in accordance with the disclosed technology.

FIG. 4 is a flowchart of a method 400 for recording and storing a video according to an embodiment of the present disclosure. The recording process 400 of the present disclosure includes the following actions.

In action 410, a raw video is captured, by an image capturing module, in a first (default) video format. In action 420, the raw video is stored in a first storage space of the storage unit. The raw video includes at least two video sessions. The lastly captured session is within a preservation window. In action 430, the video session(s) outside the preservation windows is/are converted, by a processing unit, from the first video format into a second video format, while the last video session (within the preservation window) remains intact. In action 440, the converted video session(s) is/are stored in a second storage space.

It should be noted that in the present disclosure, the second video format is inferior than the first video format. Additionally, as stated, the length of the preservation window is of a certain duration. By the operation of the present disclosure, the instant application preserve the quality of the video content(s) which is/are lastly captured, and compress those early captured contents to reduce the usage of the storage size.

Figure 5:
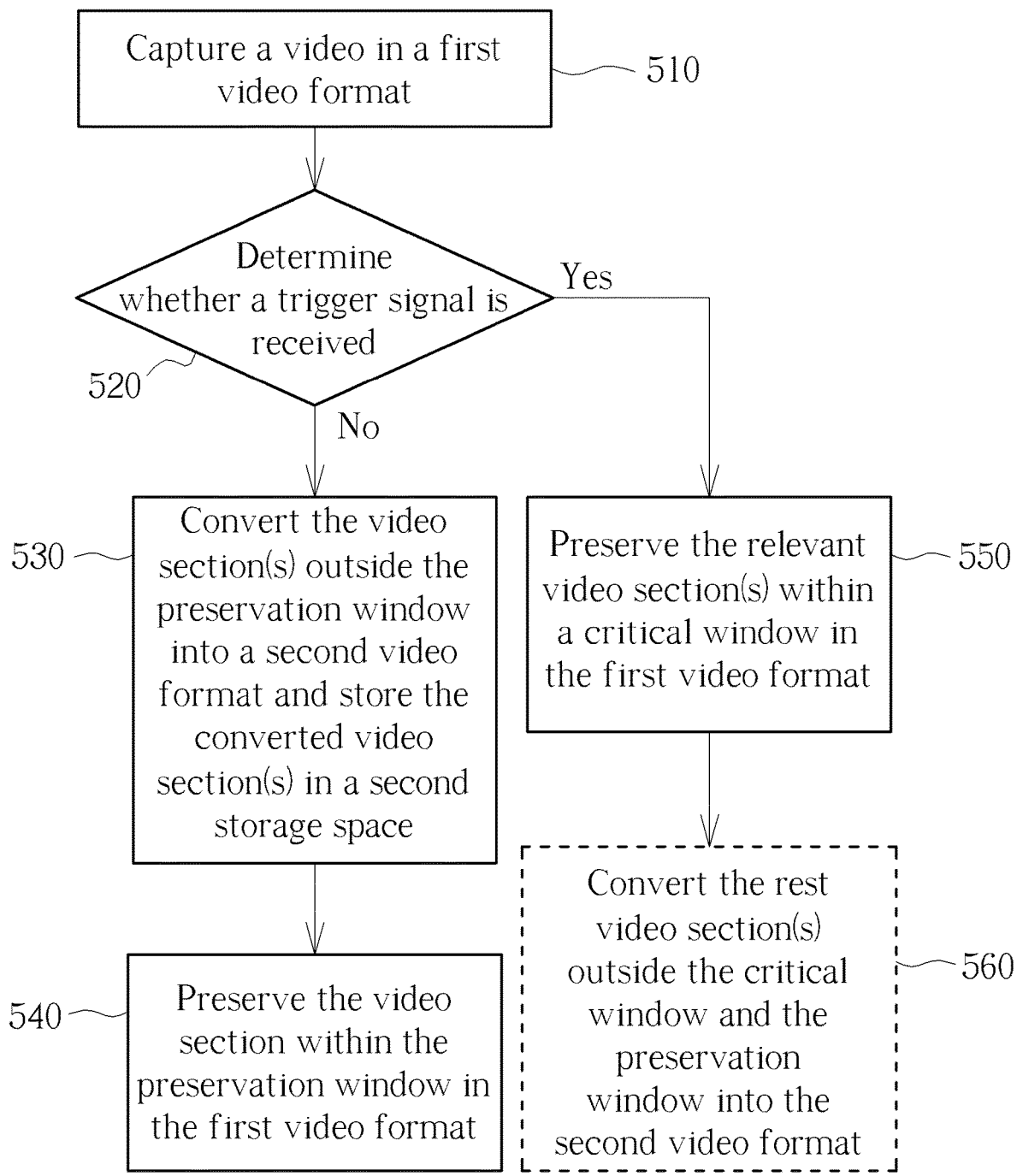
FIG. 5 is a flowchart of a method for recording and storing a video in accordance with the disclosed technology.

FIG. 5 is a flowchart of a method 500 for recording and storing a video according to another embodiment of the present disclosure. The recording process 500 of the present disclosure includes the following actions.

In action 510, a video is captured with a time stamp through the operation of an image capturing module in a first (default) video format. The video includes at least two video sessions and is temporarily stored in a first storage space.

In action 520, whether a trigger signal is received is determined through the operation of a processing unit. If the trigger signal is not received, in action 530, the video session(s) outside a preservation window is/are converted, through the operation of the processing unit, into a second video format. The second video format is inferior than the first video format. The converted video session(s) is/are stored in a second storage space. Meanwhile, in action 540, the video session within the preservation window (i.e. the lately captured video session) remains intact in the first video format. It should be noted that the lately captured video session contains the last video content of the video.

On the other hand, if the trigger signal is received, inaction 550, the relevant video session(s) is/are preserved in its first video format. The relevant video session(s) is/are the one(s) within a pre-defined critical window. That is, the relevant video session(s) may include a video session before the time point upon which the trigger signal is received, another video session after the same time point, or the combination of the above. Moreover, in one instance, the first video format is of a higher quality than the second video format.

Aside from the above, the method of the disclosed technology may further include, when a trigger signal is received, converting the rest video sessions not within the critical window and the preservation window into a second video format, as shown in action 560. Precisely, the rest video sessions are those other than the relevant video session(s) and the lately captured video session.

Embodiments of the invention may include various operations as set forth above or fewer operations or more operations or operations in an order that is different from the order described. The operations may be embodied in machine-executable instructions that cause a general-purpose or special-purpose processor to perform certain operations. That is, the techniques may be carried out in a computer system or other data processing system in response to its processor, such as a microprocessor, executing sequences of instructions. Such a computer program may be stored or transmitted in a machine-readable medium. A machine-readable medium includes any mechanism that provides (i.e. stores and/or transmits) information in a form accessible by a machined (e.g., a computer, network device, personal digital assistant, manufacturing tool, any device with a set of one or more processors). For example, a machine-readable medium includes recordable/non-recordable media such as, but not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals).

Based on the above, the video recording device of the present disclosure may convert a raw video which is of a high quality to a lower quality video and then store the converted video in a separate storage space. Given the design, the overall data size may be reduced, and more video contents can be stored in the storage unit having a limited volume. Furthermore, when a trigger signal is issued (i.e. either because a collision occurs, or a user discretionarily decides), the video recording device stores the relevant video sessions with a higher quality during the relevant time. Thus, the critical information can be preserved for later use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video recording device, comprising:
a storage unit having a plurality of storage spaces;
an image capturing module configured to capture a raw video in a first video format, wherein the raw video includes at least two video sessions; and
a processing unit connected to the storage unit and the image capturing module, wherein the processing unit is configured to:
determine whether a trigger signal is received;
when the trigger signal is not received, automatically convert a first video session captured before a preservation window from the first video format into a second video format, while preserve a second video session within the preservation window in the first video format; and
when the trigger signal is received, preserve a relevant video session of the raw video in the first video format, wherein the relevant video session includes a video session recorded immediately before the receipt of the trigger signal, a video session immediately after the receipt of the trigger signal, or the combination of the above;
wherein the first video format is of a higher quality than the second video format.

2. The video recording device of claim 1, wherein a length of the second video session within the preservation window includes the last video contents of the raw video.

3. The video recording device of claim 1, wherein the processing unit is further configured to control the storage unit to store the raw video and the second video session in one storage space, and configured to store the converted video session in another storage space.

4. The video recording device of claim 1, further comprising an input interface connected to the processing unit, wherein the input interface is configured to generate the trigger signal when a user commands through the input interface.

5. The video recording device of claim 1, further comprising a sensing unit configured to detect a collision and generate the trigger signal accordingly.

6. A method of recording and storing a video, comprising:
capturing, by an image capturing module, a raw video in a first video format, wherein the raw video includes at least two video sessions; and
determining, by the processing unit, whether a trigger signal is received;
when the trigger signal is not received, automatically converting, by a processing unit, one or more video sessions other than a video session within a preservation window from the first video format into a second video format, while preserve the video session within the preservation window of the raw video in the first video format;
and
when the trigger signal is received, preserving, by the processing unit, a relevant video session of the raw video in the first video format, wherein the relevant video session includes a video session recorded immediately before the receipt of the trigger signal, a video session immediately after the receipt of the trigger signal, or the combination of the above;
wherein the first video format is superior than the second video format.

7. The method of claim 6, wherein a length of the video session within the preservation window includes the last video contents of the raw video.

8. The method of claim 6, further comprising: controlling, by the processing unit, the storage unit to store the video session within the preservation window and the converted video sessions in separate spaces of the storage unit.

9. The method of claim 6, further comprising:
generating, by an input interface, the trigger signal when a user commands through the input interface.

10. The method of claim 6, further comprising:
generating, by a sensing unit, the trigger signal when a collision is detected.

11. A non-transitory machine-readable storage medium including instructions, which performed by one or more processors, causing the one or more processors to perform a method of recording and storing a video, the method comprising:
capturing a raw video in a first video format, wherein the raw video includes at least two video sessions;
determining whether a trigger signal is received;
when the trigger signal is not received, automatically converting one or more video sessions other than a video session within a preservation window from the first video format into a second video format, while preserving the video session within the preservation window of the raw video in the first video format;
and
when the trigger signal is received, preserving a relevant video session of the raw video in the first video format, wherein the relevant video session includes a video session immediately before the receipt of the trigger signal, a video session immediately after the receipt of the trigger signal, or the combination of the two;
wherein the first video format is of a higher quality than the second video format.

12. The medium of claim 11, further comprising: determining a length of the video session within the preservation window covering the last video contents of the raw video.

13. The medium of claim 11, further comprising: generating the trigger signal when a user commands so.

14. The medium of claim 11, further comprising: generating the trigger signal when a collision is detected.

* * * * *